Aug. 19, 1947.    A. L. SHEIFFELE    2,425,899
CONTROL DEVICE FOR APPARATUS FOR RECORDING CIRCULATORY CONDITIONS
Filed Aug. 6, 1943    2 Sheets-Sheet 1
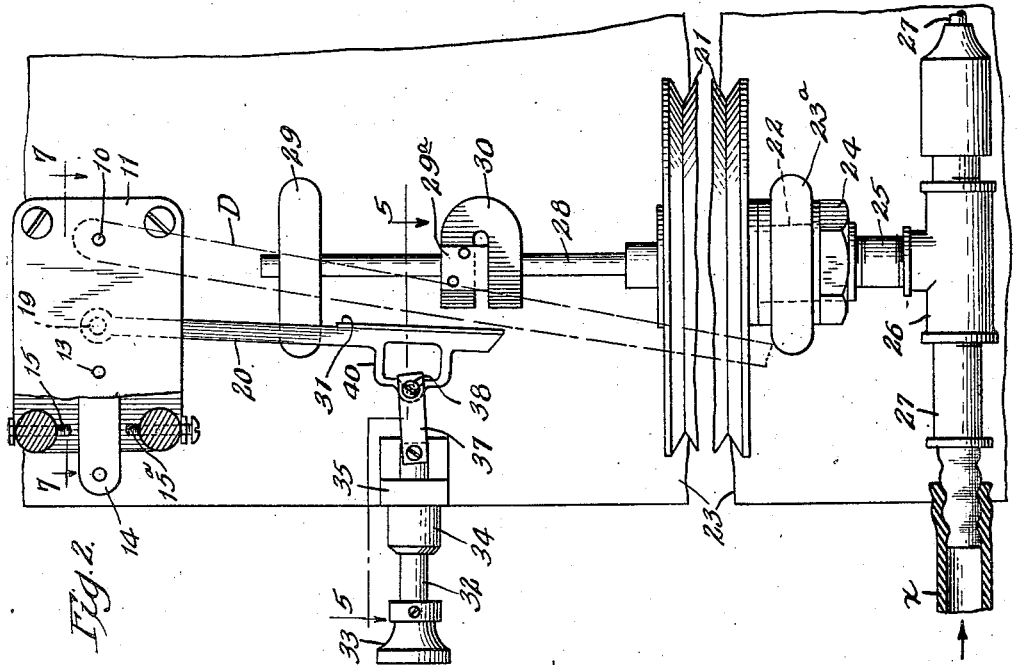
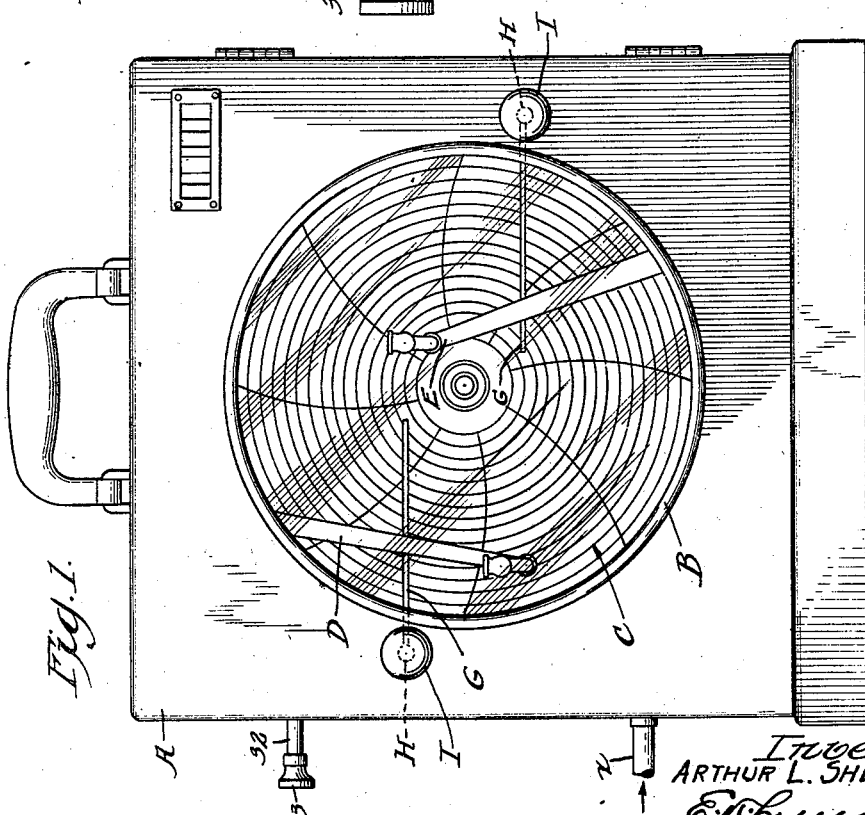
Inventor:
ARTHUR L. SHEIFFELE
BY
Atty.

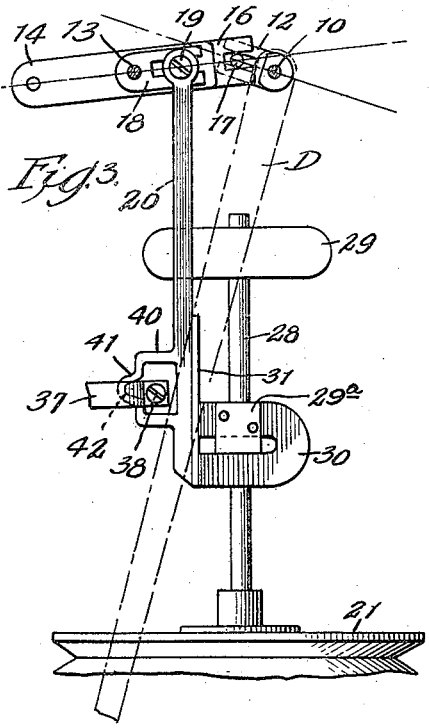
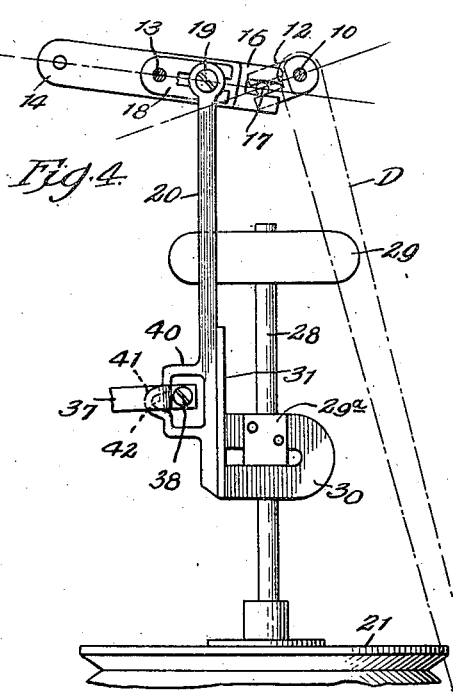
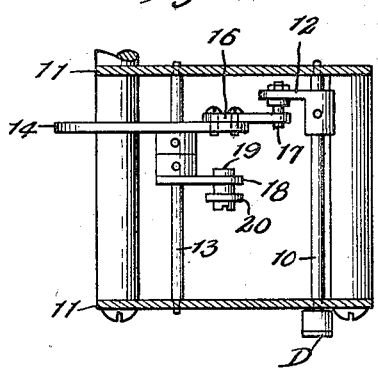
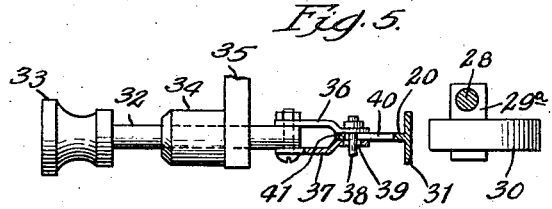
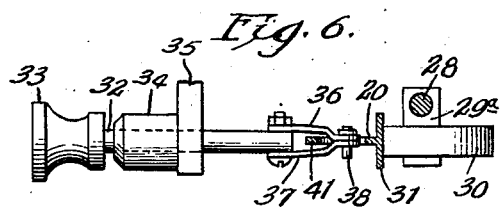

Patented Aug. 19, 1947

2,425,899

UNITED STATES PATENT OFFICE 2,425,899

CONTROL DEVICE FOR APPARATUS FOR RECORDING CIRCULATORY CONDITIONS

Arthur L. Sheiffele, Chicago, Ill., assignor to William J. Cameron, Chicago, Ill.

Application August 6, 1943, Serial No. 497,638

9 Claims. (Cl. 128—2.05)

1

This invention relates to improvements in apparatus for ascertaining and recording blood pressures, pulse or heart beats, and other conditions which are noted in the circulatory system of the human body.

Specifically, the present invention relates to control devices that are interposed between and are adapted to connect the pressure-responsive elements with the movement amplifying mechanism. These control devices embody improvements upon the specific clutch structure which is disclosed in United States Letters Patent 2,186,517 issued January 9, 1940, on the application of Thomas Bradford for improvements in an "Apparatus and method for ascertaining and recording conditions of the circulatory system."

The said prior clutch structure consists of an annular body (having operative connection with the movement amplifying and recording devices) which receives a rod that is reciprocated by an expansible bellows, and it has a clutch-seat in its bore and the bore is threaded adjacent the seat. The co-acting mechanism of said prior clutch structure is a manually rotated tube that freely surrounds said rod and screws into the threads of the bore of the body to urge a split clutch element into the seat and constrict said element around the rod. While dependable within certain limits the above-described prior structure is more or less complicated with the result that it is liable to get out of order and furthermore it possesses the inherent objection that it creates a certain amount of friction which can be neither overcome nor controlled. Also it is expensive to produce and requires skill as well as time to manipulate it.

The herein-disclosed control structure embodies a magnet member mounted preferably upon a reciprocable rod that is moved by the bellows, and there is an oscillatory member, operatively connected with the amplifying mechanism, and adapted to be manually moved into and out of the field of said magnet member. I am thus able to produce a clutching connection between the bellows and the movement amplifying mechanism that is without friction when the parts are disconnected.

The principal object of the present invention is to produce a control mechanism that is capable of operating in a manner to accomplish all of the purposes for which it has been devised and to do this in an effective and dependable manner. Other objects are to produce an apparatus of this character that is novel in construction; dependable in operation; simple and sturdy in

2 the formation and assemblage of the parts comprised in its make-up; easy to manipulate when in use; will not readily get out of order; and is economical to manufacture so that it will not increase the retail price of the apparatus in which it is installed. Numerous other objects and advantages will be apparent to persons skilled in the art after the construction and operation of this apparatus is understood from the following disclosure.

It is preferred to accomplish the numerous objects of this invention and to practice it in substantially the manner herein described and as more particularly pointed out in the claims. The accompanying drawings are referred to for an understanding of the details of this invention.

In the drawings:

Figure 1 is a front elevation of a heart test apparatus in which my improvements are adapted to be incorporated.

Figure 2 is a vertical elevation of a portion of the operating mechanism showing my invention installed therein, certain portions of my control devices being shown in disconnected or inoperative positions.

Figure 3 is a view in front elevation showing details of my control devices with the elements moved to an operative position.

Figure 4 is a view similar to Figure 3 showing the parts in another position of operation.

Figures 5 and 6 are horizontal views made on the plane of line 5—5 in Figure 2, and showing the parts in different relative positions.

Figure 7 is a plan of the movement amplifying levers, the views being made on the plane of line 7—7 in Figure 2.

The drawings, it will be understood, are more or less schematic in character for the purpose of illustrating a typical or preferred embodiment of this invention, and in these drawings like reference characters are used to identify like parts wherever said parts appear in the different views. While my control devices are disclosed herein as applied to a particular apparatus by which conditions in the circulatory system may be ascertained and recorded, it is obvious my improvements are equally capable of being readily applied to mechanisms used in other apparatus for producing cardio-graphs, or for noting and recording the high or low blood-pressures, the pulse, or the heart-beats.

Briefly stated, the apparatus embodies pressure-responsive devices that are adapted, when coupled with a movement-amplifying mechanism, to actuate said mechanism and move a pointer which inscribes a record on a mobile chart or scale. Prior to inscribing on this chart or scale, the pressure-responsive devices are free to move independently of the amplifying mechanism in order that said devices may be expanded by a pressure charge without disturbing the position of the pointer. My control structure affords convenient means for dependably coupling and releasing these related portions of the apparatus. This control is manually operated or manipulated by the physician or other person making the graph or investigating a patient's circulatory conditions.

The apparatus is housed in a suitable carrying case the front wall of which provides a hinged door A having a large central window B that is closed by a glass panel through which the ruled graph-sheet or chart C is visible. The chart is rotated clockwise at a speed of one revolution per minute by a suitable 60-cycle electric motor (not shown) so that convenient readings may be taken from the matter recorded thereon to ascertain the rapidity of heart-beat. Recordings are made upon the chart by means of suitable pointers or arms D and E, each of which carries a stylus upon its movable free end. The arm E is actuated by suitable mechanism and a bellows (not shown) for indicating and recording pressures of the circulatory system and for recording the pressure at which the heart-beats are inscribed on the chart. The arms D and E may be selectively moved out of contact with the graph sheet or chart by means of wire lift members G that are disposed back of said arms and are carried upon suitable retractable members H adapted to be moved in and out by the buttons I projecting through the door of the cabinet where they are manually available to the person operating the apparatus.

The arm D is preferably pendent from its upper end which is provided with a hub that is frictionally mounted upon the projecting end of a rock-spindle 10 extending between and journaled in spaced plates 11, as detailed in Figure 7, and said spindle has a bifurcated or slotted lever 12 adjustably secured to it adjacent its end opposite the pointer arm D. Another rock-spindle 13, disposed parallel to the first spindle 10, is similarly journaled in the plates 11 and has an elongated lever arm 14 adjustably mounted upon it. Lever arm 14 is fulcrumed intermediate its ends and its movement is limited in one direction by an adjustable stop 15 carried by the adjacent lower spacer which connects the plates 11 and it is limited in its other direction of movement by engagement with adjustable stop 15a. The end of the lever arm 14 nearest the lever 12 has a slotted plate 16 secured to it the slot of which is engaged by a lateral stud 17 that is adjustable longitudinally in the bifurcation of lever arm 12. The means for moving the rock-spindle 13 (which responds to movement of the pressure-sensitive devices later to be described), embodies a rocker arm 18 having a forked free end and mounted adjustably upon the rock-spindle 13 alongside the boss of the lever 14. The bifurcation of the rocker arm 18 has a stud 19 adjustably carried therein and said stud provides a pivot for the upper end of an oscillatory or swinging bar 20 that is adapted to have its lower free end suitably connected to and disconnected from the pressure-responsive devices, so that, when connected with the latter, it will transmit movement thereof, through the system of levers above described, to the rock-spindle 10 and such movement is indicated by the swinging lower end of the pointer D and will be recorded on the chart by the inscribing pen at the free end of the pointer.

The pressure-responsive element is preferably in the form of an expansible bellows 21. The lower end plate of the bellows has a tubular threaded boss 22 that is screwed into a bracket 23a projecting horizontally from the mounting plate 23 that carries the mechanism of the apparatus and said bellows is anchored in position by a lock-nut 24 as shown in Figure 2. A pipe 25 communicates with the boss 22 and extends from a T-coupling 26 forming a portion of the closed conduit 27 by which pressure fluid is admitted to the bellows 21. The means for creating pressure in the closed conduit is preferably in the form of a surgical arm-band that is wrapped about the patient's arm, preferably above the elbow, so that the usual elastic bag in the arm-band, when inflated, is pressed against and will be influenced by the action of the brachial artery. A flexible pipe or hose x leads from the elastic bag to the protruding end of pipe 27 and provides a continuation of said closed conduit.

The upper end plate of the bellows is provided with a longitudinally reciprocated vertical rod or shaft 28 that has its upper portion freely journaled in a bearing bracket 29 projecting horizontally from the mounting plate 23 so that said rod may be moved up and down with the expansion or contraction or vibratory motion of the bellows. About midway its height the rod 28 has a block 29a adjustably connected to it, which block carries a horseshoe-magnet 30 that is slidably mounted so that it may be adjusted horizontally in a direction transverse to the axis of the rod 28. The lower end portion of the bar 20 has a rectangular-shaped plate 31 secured to it that is adapted, when moved into the field of the magnet, to be attracted to the ends of the poles or arms of said magnet. In this manner the pressure-responsive element effectively connects the oscillating bar 20 with the movement-amplifying mechanism which actuates the pointer arm D.

The means for manually operating this mechanism preferably comprises a longitudinally reciprocable plunger 32 that extends outside the case or cabinet where it is provided with a hand grasp or head 33 and its shank is journaled for sliding movement in a boss 34 at the adjacent end of a horizontal bracket 35 that projects from the mounting plate 33. The inner portion of this plunger projects beyond its bearing, and it has a pair of small, oppositely-shaped, spring links 36 and 37 rigidly connected to it so that they provide an extension at the inner end of the plunger. The free portions of these spring links are converged toward each other and there is a lateral pin 38 secured to the link 36 so that it extends through an opening 39 in the opposing link, thus permitting the adjacent portions of the links to be yieldably moved away from each other at their ends opposite their anchored portions.

The pin 38 is disposed inside a rectangular-shaped open frame 40 formed on the adjacent lower portion of the oscillating bar 20, preferably at about midway the length of the plate 31 that is attracted to the magnet 30. This frame 40 has an offset portion 41 at its outer side in which there is a slot 42 that forms an extension of the open portion of the frame 40 and extends towards the plunger. The edges of the slot approaching the open part of the frame 40 spread apart or diverge from each other substantially in the manner shown to provide a tapered mouth to permit easy entrance of the pin 38 into the slot 42. The pin and slot arrangement provides a self-centering device for the movement-amplifying mechanism.

When the plunger is pulled outwardly from the position shown in Figure 4 the spring links 36 and 37 which are disposed upon each side of the offset 41 will spread at their converged ends as the pin 38 enters the mouth of and then into the slot 42 as shown in Fig. 5. Upon reaching the limit of the slot 42 the pin will engage the end wall of the slot and further outward movement of the plunger will pull the bar 20 and its plate 31 in a direction away from the magnet so that said plate is disengaged and is moved out of the influence of the magnetic field. The normal relation of the motion amplifying mechanism is that in which the rod 32 has been pushed inwardly to position the plate 31 within the field of the magnet 30 to be attracted thereto, so that the motion of rod 28 may be transmitted, in an amplified degree, to the operating mechanism for pointer D. In this latter position the pin 38 in the slot will support the bar 20 in proper position to maintain the amplifying mechanism in normal relation.

When the bellows 21 is responsive to a variable or vibratory pressure, such as when the pressure of the arm-band on the brachial artery is of a pulsating character—in other words, between the critical points of systolic and diastolic pressures—such pulsations of the bellows, responsive to the heart-beat will cause the bar 20 to vibrate in an up and down direction and move the amplifying mechanism in a reciprocating manner. This movement is transmitted to the pointer and the heart-beats are inscribed in a serrated line by the stylus upon the chart for a permanent record thereof.

What I claim as new is:

1. Apparatus for recording conditions of the circulatory system embodying movement amplifying mechanism; a pressure-responsive device below said mechanism; and means adapted to connect and disconnect said mechanism with respect to said device, said means embodying a magnet moved up and down by said pressure-responsive device; an oscillating member supported pendently from a portion of said amplifying mechanism, the free lower portion of said member adapted for movement into and out of the field of said magnet; and manually actuated control means for moving the lower portion of said oscillating member, said control means being constructed and arranged to be released from said oscillating member when said member is in the field of said magnet.

2. Apparatus for recording conditions of the circulatory system embodying movement amplifying mechanism; a pressure-responsive device below said mechanism; and means adapted to detachably connect said mechanism to said device, said means embodying a magnet supported by said pressure-responsive device and moved up and down therewith; an oscillating member supported pendently from a portion of said amplifying mechanism, the free lower portion of said member adapted for movement into and out of the field of said magnet; and manually actuated control means for moving the lower portion of said oscillating member, said control means having a latch connecting it to said member whereby said control means may be released from said oscillating member when said member is in the field of said magnet and thereby permit said oscillating member, said magnet and said amplifying mechanism to move in unison and independent of said manually actuated control means.

3. Apparatus for recording conditions of the circulatory system embodying a reciprocable shaft; pressure-responsive means adapted to reciprocate said shaft; driven devices actuated by the movement of said shaft; and a clutch assembly adapted to connect and disconnect said shaft and said driven devices, said assembly comprised of a magnet, an armature movable into and out of the field of said magnet, and means for effecting such movement of said armature.

4. Apparatus for recording conditions of the circulatory system embodying a longitudinally reciprocable shaft; pressure-responsive means for moving said shaft; movement amplifying means adapted to be actuated by reciprocatory movement of said shaft; a magnet on said shaft; a swinging member operatively connected to said amplifying means and movable into and out of the field of said magnet; and means for swinging said member, whereby to connect and disconnect said shaft and said amplifying means.

5. Apparatus for recording conditions of the circulatory system embodying a longitudinally reciprocable shaft; movement amplifying means adapted to be actuated by said shaft; pressure-responsive means for moving said shaft; a magnet on said shaft; an oscillating member operatively connected to said amplifying means, a portion of said member adapted for movement into and out of the field of said magnet; and manually operated control means for moving said oscillating member, whereby to connect and disconnect said shaft and amplifying means.

6. Apparatus for recording conditions of the circulatory system embodying a rock-spindle; a pointer carried thereby; a plurality of co-acting levers, one of which levers is fulcrumed on said rock-spindle; an oscillating member connected to one of said levers; a longitudinally reciprocable shaft; pressure-responsive means for moving said shaft; a magnet on said shaft; and manually operable control means for moving said oscillating member to position a portion thereof into and out of the field of said magnet, whereby to connect and disconnect said shaft and amplifying means.

7. Apparatus for recording conditions of the circulatory system embodying a rock-spindle; a pointer carried thereby; a plurality of movement amplifying levers, one of which levers is fulcrumed on said rock-spindle; an oscillating arm supported by one of said levers to bodily move therewith and swing independently thereof; a longitudinally reciprocable shaft; pressure-responsive means for moving said shaft; a magnet on said shaft; manually operable control means for moving said oscillating arm into and out of the field of said magnet, whereby to connect and disconnect said shaft and amplifying levers; and means whereby said arm is released from said control means when said member is attracted to said magnet.

8. Apparatus for recording conditions of the circulatory system embodying a longitudinally reciprocable shaft; movement amplifying means adapted to be actuated by said shaft; pressure-responsive means for moving said shaft; a magnet on said shaft; an oscillating arm supported pendently on a portion of said amplifying means, the lower portion of said member having movement into and out of the field of said magnet; and manually operable control means for moving said arm whereby to connect and disconnect said shaft and said amplifying means.

9. Apparatus for recording conditions of the circulatory system embodying a movement amplifying lever assembly; a pressure responsive device below said mechanism; and means adapted to connect said assembly to said device, said means embodying a magnet moved up and down by said pressure-responsive device; and an oscillating arm supported pendently from a member of said leverage assembly, the lower portion of said arm being adapted for movement into and out of the field of said magnet.

ARTHUR L. SHEIFFELE.

REFERENCES CITED

The following references are of record in the file of this patent:

UNITED STATES PATENTS

| Number | Name | Date |
| --- | --- | --- |
| 2,186,517 | Bradford | Jan. 9, 1940 |
| 2,196,909 | Bradford | Apr. 19, 1940 |
| 2,187,834 | Mantz | Jan. 23, 1940 |
| 646,889 | Sundh | Apr. 3, 1900 |
| 727,573 | Beals | May 12, 1903 |
| 701,290 | Buck | June 3, 1902 |
| 2,343,861 | Biggle | Mar. 14, 1944 |